United States Patent [19]

Paquin

[11] Patent Number: 5,271,845
[45] Date of Patent: Dec. 21, 1993

[54] AEROBIC BIOLOGICAL PROCESS FOR TREATING WASTE SLUDGES

[75] Inventor: Jean Paquin, Ste-Julie, Canada

[73] Assignee: Sanexen Services Environmentaux Inc., Varennes, Canada

[21] Appl. No.: 860,594

[22] Filed: Mar. 30, 1992

Related U.S. Application Data

[63] Continuation of Ser. No. 672,859, Mar. 20, 1991, abandoned.

[51] Int. Cl.⁵ .............................................. C02F 3/02
[52] U.S. Cl. ..................... 210/606; 210/609; 210/613; 210/620; 210/631
[58] Field of Search ............... 210/606, 609–613, 210/620, 623, 631

[56] References Cited

U.S. PATENT DOCUMENTS

| | | | |
|---|---|---|---|
| 3,801,499 | 4/1974 | Luck | 210/606 |
| 3,828,198 | 9/1974 | Bellamy et al. | 210/606 |
| 3,864,247 | 2/1975 | Fuchs | 210/612 |
| 4,132,638 | 1/1979 | Carlsson | 210/606 |
| 4,328,104 | 5/1982 | Hanke et al. | 210/613 |
| 4,430,225 | 2/1984 | Takamatsu et al. | 210/608 |
| 4,500,427 | 2/1985 | Suzuki et al. | 210/608 |
| 4,584,102 | 4/1986 | Bogart et al. | 210/610 |
| 4,749,494 | 6/1988 | Tomoyasu et al. | 210/626 |
| 4,882,059 | 11/1989 | Wong et al. | 210/606 |

*Primary Examiner*—Thomas Wyse
*Attorney, Agent, or Firm*—Foley & Lardner

[57] ABSTRACT

Waste sludges containing up to 35% weight percent hydrocarbon contaminants and up to 50% weight percent inorganic materials are treated to induce acclimation of indigenous microbes present therein, the acclimated indigenous microbes thereby releasing extra-cellular enzymes capable of catalyzing hydrolysis of at least the hydrocarbon contaminants in the waste sludges. This step is pursued until a substantial increase of biological activity takes place in the waste sludges. Biological activity is allowed to continue at an increased rate until the hydrocarbon contaminants are substantially biodegraded.

20 Claims, No Drawings

AEROBIC BIOLOGICAL PROCESS FOR TREATING WASTE SLUDGES

This application is a continuation of application Ser. No. 07/672,859, filed Mar. 20, 1991, now abandoned.

BACKGROUND OF INVENTION (a) Field of the Invention

The present invention relates to an aerobic biological process for treating waste sludges which are difficult to treat using conventional biological techniques. The process developed is applicable but not limited to waste sludges containing oils, greases, suspended materials and other such compounds as have been resistant to conventional biological treatment. The present invention is directed to the treatment of such concentrated waste sludges containing up to 60% suspended material through enzyme catalyzed extra-cellular biological reactions which are promoted in a properly acclimated colloidal process. In most cases the environmental impacts associated with the further treatment (if required) and disposal of the treatment residues are greatly lessened due to the order of magnitude reduction in organic contaminants and in biochemical oxygen demand which has occurred in the waste sludge.

(b) Description of Prior Art

The use of biological processes to treat water containing organic compounds at low concentrations has been well documented in the prior art. The use of activated sludge for treating municipal and industrial waste water involves the acclimation of populations of many species of micro-organisms, each playing an active part in the bio-degradation of the dissolved and un-dissolved compounds found in the sewage. However, the concentrations of compounds found in these systems are approximately two to three orders of magnitude lower than those encountered in the waste sludges mentioned above. Oil and grease contamination in these systems in excess of 100 parts per million (ppm) are not easily tolerated by the activated sludge systems. In addition, it is not common practice to operate these systems with suspended solids concentrations in excess of 10,000 ppm, and it is more normal to maintain these concentrations below 5,000 ppm to promote good operation of the process.

It is important at this point to distinguish between the waste sludges intended for disposal by the process according to this invention, and the term "activated sludge" which is often used in the prior art and can be misunderstood to mean treatment of sludge. Activated sludge is a medium which contains large populations of acclimated micro-organisms for the purpose of treating waste water. The activated sludge is mixed with incoming waste water and provided with a suitably aerated environment in which the population of microorganisms metabolize the organic matter in suspension and solution in the waste water.

The waste sludges destined for disposal by the process according to the invention contain few or non acclimated indigenous micro-organisms. This lack of acclimated indigenous micro-organisms and the refractory properties of the organic contaminants are the precise properties of the waste sludges being considered which make them difficult to treat biologically. In the past, these types of sludges have been subjected to land-farming applications whereby the indigenous micro-organisms eventually oxidize the contaminants and decrease their concentrations over a period of months or years, while often limiting the use of the land in question during a prescribed restriction period.

U.S. Pat. No. 4,749,494 describes a treatment process for the treatment of waste water with activated sludge which makes use of an ultra filtration membrane and involves a recirculation of liquid from the digestion tank to a reaction tank. The process is not suitable for treating oily wastes.

U.S. Pat. No. 4,584,102 describes the treatment of waste water and sludge, in which clean water, bacteria, nutrients and emulsifiers are used in a treatment unit constructed in a portion of a lagoon or impoundment.

U.S. Pat. No. 4,500,427 describes a treatment of waste water with activated sludge wherein the addition of air into the aeration tank is critical.

U.S. Pat. No. 4,430,225 describes the treatment of sewage using a special type tank.

It will be seen from a review of current literature that the above referenced activated sludge patents employ limited extra-cellular enzyme activity, generally characterized by holozoic nutrition, with intra-cellular enzymic digestion accompanied by active substrate transport for the treatment of the contaminants contained in the carriage waters. The acclimation period for such systems is short due to the abundance of species which readily acclimate to the contaminants in the waste water being treated. The formation of flocs within conventional activated sludge systems is primarily comprised of heterotrophic gram-negative bacteria.

SUMMARY OF INVENTION

The process according to the invention employs extra-cellular enzyme catalyzed activity with both passive and active substrate transport in waste sludges which may comprise oily sludges, emulsions or colloidal suspensions. During the initial stages of acclimation, indigenous microbes begin the acclimation process through passively diffusive metabolic mechanisms which involve the release of extra-cellular enzymes to promote the hydrolysis of the contaminants. As the level of enzyme production increases, the hydrolysed products from the contaminants may attain colloidal sizes and lipid solubility and increase in passive transport rate due to the relatively high concentrations of hydrolysed contaminant products in the waste sludge. As the concentration of hydrolysed products decreases in the waste sludge due to metabolic up-take, the demand for nutrition by the acclimated species shifts the substrate up-take mechanism from a passive mechanism to an active mechanism due to shifts in the osmotic pressure experienced by the microbes. Whereas the passive transport mechanism is responsible for the initial production of extra-cellular enzymes to catalyze the hydrolysis reactions, this passive transport requires no biological energy input and results in little production of heat. Consequently it may be beneficial to the microbe growth rates during the passive transport period to provide heat to the process to maintain the mixture preferably between 25 and 40 Celsius. Once the competition for nutrition shifts the metabolic pathway from a passive to an active mode, there is an increase in biological activity as the microbe population with the applicable permease enzyme for the hydrolysed contaminant products becomes the dominant species within the system. This activity may be represented by a markedly exothermic conditions. Intra-cellular concentrations of substrate increases dramatically as does the growth rate of the dominating microbes. During this aerobic biological process, oxygen may be supplied through a conventional mechanism of aerating the waste sludge.

It is the object of the present invention to provide a process that operates with waste sludges of a high solids content. The principal contaminants in these sludges are generally non-soluble and difficult to degrade biologically.

It is another object of the present invention to provide a process for treating waste sludges containing water and up to 35 weight percent high molecular weight hydrocarbons such as hydrocarbons with molecular weights greater than 100, higher concentrations being adjusted through the addition of diluent water.

It is another object of the present invention to provide a process for treating sludges containing as little as 40 weight percent water, this lower limit being controlled by mixing, the remaining 60% comprising both organic and inorganic contaminants, the sludges containing higher weight percentages of contaminants being adjusted by the addition of diluent water.

It is another object of the present invention to provide a high-rate system which can operate in batch or continuous modes while treating organic materials which are not readily degraded biologically. Some examples of these wastes include high molecular weight compounds such as polyaromatic hydrocarbons, coal derived hydrocarbons and petroleum derived hydrocarbons.

It is another object of the present invention to provide a biological process which alters the rate of release of energy from the biological oxidation of the waste sludge components. The exploitation of this alteration in metabolic pathways creates highly exothermic biological activity.

It is another object of the present invention to provide a process which utilizes the energy released during the exothermic biological activity to evaporate some of the water contained in the residue, thus contributing to further weight and volume reduction of that residue.

It is another object of the invention to induce the biological production of suitable enzymes and co-enzymes which are used to catalyze reactions at rates necessary for biological growth and process maintenance.

It is another object of the present invention to employ extra-cellular enzyme catalyzed activity with both passive and active substrate transport in waste sludges, thus initiating the hydrolysis of the contaminants outside of the micro-organism cell walls. The term passive substrate transport means the property of extra-cellular enzymes released by indigenous microbes to hydrolyze contaminants when the waste sludge is treated to induce acclimation of the indigenous microbes. The term active substrate transport means the property of the enzymes to hydrolyze contaminants once biological activity has become intense to the point of being markedly exothermic.

It is another object of the present invention to use enzyme catalyzed biological activity to reduce to colloidal sizes, the particles of contaminant contained in the sludge wastes to be treated by the process according to this invention.

It is another object of the present invention to use the colloidal properties which are developed within the mixed waste sludge due to the enzyme catalyzed hydrolysis, to form minute droplets of hydrolysed hydrocarbon and organic products from the original organic contaminants in the waste sludge, which thereby remain in suspension and in intimate contact with the active microbe population.

It is another object of the present invention to use biomass from previous batches of waste treated, so as to inoculate future batches of waste sludge up to levels of approximately 10 weight percent biomass.

It is another object of the present invention to accelerate the time required, through the provision of heat, to the process during the passive transport period of microbial growth. As the process switches from passive to active substrate transport, the requirement for externally supplied heating drops as the process becomes markedly exothermic.

It is another object of the present invention to add oxygen to the waste sludge by conventional means such as aeration of the waste sludge, oxygen being added to maintain the process under an aerobic condition. The aeration also provides some mechanical mixing of the waste sludge to promote and can allow settling of coarse inorganic contaminants.

The invention broadly relates to a process for the aerobic biological treatment of waste sludges containing up to 35% weight percent hydrocarbon contaminants and up to 50% weight percent inorganic materials which comprises a) treating said waste sludges to induce acclimation of indigenous microbes present therein, said acclimated indigenous microbes thereby releasing extra-cellular enzymes capable of catalyzing hydrolysis of at least said hydrocarbon contaminants in said waste sludges, b) pursuing step (a) until a substantial increase of biological activity takes place in said waste sludges; and c) allowing said biological activity to continue at an increased rate until said hydrocarbon contaminants are substantially biodegraded.

Preferably, the process comprises pre-treating the waste sludges to remove coarse inorganic materials therefrom. The pre-treatment also assists in separating the hydrocarbon contaminants from the inorganic materials.

In accordance with a preferred embodiment, an emulsifying agent may be added to the waste sludge to separate the hydrocarbon contaminants from the inorganic materials. Preferably, there is a mechanical mixing of the waste sludges to increase the action of the emulsifying agent.

During the first step of the process, nutrients may be added to the waste sludges, and alkaline agents may also be added to adjust the pH so as to promote the acclimation.

Preferably, the process comprises heating the waste sludges under conditions effective to promote emulsification thereof, promote reduced viscosity of the sludges and promote indigenous microbe acclimation and growth.

The acclimation may be carried out for a period sufficient to enable an increase of extra-cellular enzyme production, yielding hydrolysed products of colloidal sizes from the hydrocarbon contaminants in the waste sludges. The preferred acclimation period is from 20 to 30 days.

In accordance with another preferred embodiment of the invention, mechanical mixing of the waste sludges is reduced or discontinued upon formation of colloidal suspensions created by extra-cellular catalyzed enzymic hydrolysis reactions.

However, mechanical mixing may be continued until hydrolysed contaminant products forming the colloidal suspensions attain lipid solubility.

Heating of the waste sludges is preferably carried out under conditions to maintain the temperature between 25 and 40 Celsius. Heating is preferably decreased or interrupted as exothermic activity increases in the waste sludges.

In accordance with another preferred embodiment, oxygen is added to the waste sludges so as to maintain an aerobic state therein.

Activated sludge from previously acclimated waste sludges may be added to inoculate new waste sludge with up to 10 weight percent of suitably acclimated biomass.

Nutrients, emulsifiers and pH controlling alkaline agents may be added to the waste sludges as required based on an analysis of the waste sludge.

pH buffers are preferably added to the waste sludge to maintain the pH between 7.0 and 8.5.

During initial emulsification, heating may be carried out to assist in stripping of organic contaminants from inorganic contaminants contained in the waste sludge.

The heat released through the biological exothermic activity may be used to reduce the volume of treated waste sludge by evaporation of water contained in the treated sludge, in an amount to reduce treated sludge volumes up to 60 percent.

DESCRIPTION OF PREFERRED EMBODIMENTS

In accordance with the invention, there is provided a process for the treatment of waste sludges, enabling the initial mechanical and chemical emulsification of the waste sludge, the separation of the coarse inorganic contaminants and the biological treatment of the organic contaminants through extra-cellular enzyme catalyzed activity with both passive and active substrate transport in waste sludges which comprise oily sludges, emulsions or colloidal suspensions. Pre-treatment of the waste sludge is conducted prior to the biological treatment. This pre-treatment involves chemical and physical conditioning of the waste sludge, the chemical conditioning involving the addition of emulsifiers to assist in the separation of organic contaminants from inorganic solids, the addition of suitable nutrients and the addition of suitable agents to adjust the pH. The physical conditioning enables the removal of the coarse inorganic materials, with mechanical mixing assisting the action of the emulsifying agent, and heating creates a suitable temperature regime to promote indigenous microbe acclimation and growth.

During the initial stages of the subsequent biological treatment of the pre-treated waste sludges, the acclimation of indigenous microbes begins through passively diffusive metabolic mechanisms, a process which is not typical of currently applied in-vessel biological treatment processes, the passive diffusive metabolic mechanisms involving the release of extra-cellular enzymes to promote the hydrolysis of the mechanically emulsified contaminants. As the level of enzyme production increases, the hydrolysed products from the contaminants attain colloidal sizes with the hydrolysed contaminant products attaining lipid solubility and increasing in passive transport rate due to the relatively high concentrations of hydrolysed contaminant products in the waste sludge.

As the concentration of hydrolysed products in the waste sludges decreases, the demand for nutrition by the acclimated species shifts the substrate uptake mechanism to an active mode as a result of shifts in the osmotic pressure experienced by the acclimated microbes. Whereas the passive transport mechanism is responsible for the production of enzymes to catalyze the hydrolysis reactions, this passive transport requires no energy input and results in little production of heat. Once the competition for nutrition shifts the metabolic pathway from a passive to an active mode, there is a progressive increase in biological activity as the microbe population with the applicable permease enzyme for the hydrolysed contaminant products becomes the dominant species within the system. This activity becomes markedly exothermic. Intra-cellular concentrations of substrate increases as does the growth rate of the dominating species. As the exothermic activity increases, the requirement for heating diminishes, and in most weather conditions, disappears.

Formation of an emulsion is initiated through mechanical mixing and/or the addition of suitable emulsifying agents appropriate to the waste sludge, the purpose of which is to separate organic material which may coat inorganic materials and place the organic materials in suspension while providing a mechanism for the separation of the coarse inorganic material.

The process includes a pre-treatment of the mixture to remove coarse suspended particles therefrom. This may be carried out by agitation of the waste sludge in a vessel or other means known to those skilled in the art, thereby causing the suspended materials such as sand and other coarse particles to settle at the bottom of the vessel where they are allowed to exit.

Oxygen is added through the standard practice of aeration so as to maintain the process in an aerobic state.

Biomass from previously acclimated systems may be added to new waste sludge to inoculate the mixture with up to 10 weight percent biomass therein. Nutrients, emulsifiers and pH corrective chemicals are also added to the waste sludge as required based on analyses of the waste sludge prior to the biological treatment. pH corrective chemicals, normally alkaline agents, are added to the waste sludge to maintain the pH between 7.0 and 8.5, with these additions being carried out during the mixing stages.

As the enzyme catalyzed biologically induced hydrolysed contaminant products form colloidal sized dispersions, mechanical mixing can be reduced or discontinued. During the initial emulsifying, heat is used to help separate the organic contaminants from the inorganic contaminants, it is also used during the acclimation period when passive transfer and enzyme production is slow.

The resulting residue from the process according to the invention may be further treated with a de-watering step in order to prepare the residue for land application or other disposition as appropriate. In practice, the process according to the invention is carried out in several steps to pre-condition the waste sludge thereby removing the coarse inorganic contaminants, to emulsify the waste sludge thereby stripping the organic contaminants from inorganic contaminants and placing the stripped organic contaminants in suspension in the waste sludge, to induce the acclimation of the microbes in the sludge following the pre-conditioning steps and to biologically reduce the remaining organic contaminants under conditions which become very exothermic and to employ this exothermic biological energy to reduce the net volume of the sludge through evaporation of water from the waste sludge. The selection of vessels for each step, thereby defining a system is not critical to the process.

In practice, the process is used to treat oily sludges while reducing the volume of the sludge by as much as 60% as a result of the water loss from the waste sludge due to the application of the exothermic biological energy.

Test runs on over 6,000 tons of refinery oily sludges have also shown that the levels of oils and greases in such waste sludges have been reduced from initial concentrations of 5%-30% to final concentrations of 0.1%-2.0% respectively.

I claim:

1. Process for the aerobic biological treatment of waste sludges containing up to 35% weight percent hydrocarbon contaminants and up to 50% weight percent inorganic materials which comprises
   a) treating said waste sludges, including heating the waste sludges to maintain a temperature between 25° and 40° C. essentially to induce acclimation of indigenous microbes already present therein, said acclimated indigenous microbes thereby releasing extra-cellular enzymes capable of catalyzing hydrolysis of at least said hydrocarbon contaminants in said waste sludges,
   b) pursuing step (a) until a substantial increase of biological activity takes place in said waste sludges; and
   c) allowing said biological activity to continue at an increased rate until said hydrocarbon contaminants are substantially biodegraded.

2. Process according to claim 1, which comprises pre-treating said waste sludges to remove coarse inorganic materials from said waste sludges.

3. Process according to claim 2, wherein said pre-treating also assists in separating the hydrocarbon contaminants from the inorganic materials.

4. Process according to claim 3, which comprises adding an emulsifying agent to separate said hydrocarbon contaminants from said inorganic materials.

5. Process according to claim 4, which comprises mechanically mixing said waste sludges to increase the action of said emulsifying agent.

6. Process according to claim 5, wherein mechanical mixing of the waste sludges is reduced or discontinued upon formation of colloidal suspensions created by extra-cellular catalyzed enzymic hydrolysis reactions.

7. Process according to claim 6, wherein said mechanical mixing is continued until hydrolysed contaminant products forming the colloidal suspensions attain lipid solubility.

8. Process according to claim 5, wherein nutrients, emulsifiers and pH controlling alkaline agents are added to the waste sludges as required based on an analysis of the waste sludge.

9. Process according to claim 8, wherein pH buffers are added to the waste sludge to maintain the pH between 7.0 and 8.5.

10. Process according to claim 1, wherein nutrients are added to said waste sludges during step (a).

11. Process according to claim 1, wherein alkaline agents are added to said waste sludges during steps (a) or (b) or (c) to adjust pH so as to promote said acclimation.

12. Process according to claim 1, which comprises heating said waste sludges under conditions effective to promote emulsification thereof, promote reduced viscosity of the sludges and promote indigenous microbe acclimation and growth.

13. Process according to claim 12, wherein said heating is carried out during initial emulsification to assist in stripping of organic contaminants from inorganic contaminants contained in the waste sludge.

14. Process according to claim 1, wherein the acclimation is carried out for a period sufficient to enable an increase of extra-cellular enzyme production, yielding hydrolysed products of colloidal sized form the hydrocarbon contaminants in said waste sludges.

15. Process according to claim 14, wherein the acclimation period is from 20 to 30 days.

16. Process according to claim 1, which comprises decreasing or interrupting said heating as exothermic activity increases in said waste sludges.

17. Process according to claim 16, wherein heat released through the biological exothermic activity is used to reduce the volume of treated waste sludge by evaporation of water contained in the treated sludge.

18. Process according to claim 17, wherein water is released through biological exothermic activity to reduce treated sludge volumes up to 60 percent.

19. Process according to claim 1, wherein oxygen is added to the waste sludges so as to maintain an aerobic state therein.

20. Process according to claim 1, wherein activated sludge from previously acclimated waste sludges is added to inoculate new waste sludge with up to 10 weight percent of suitably acclimated biomass.

* * * * *

UNITED STATES PATENT AND TRADEMARK OFFICE
CERTIFICATE OF CORRECTION

PATENT NO. : 5,271,845
DATED : December 21, 1993
INVENTOR(S) : Jean Paquin

It is certified that error appears in the above-indentified patent and that said Letters Patent is hereby corrected as shown below:

Title page, item [73], Assignee: should read--Sanexen Services Environnementaux Inc.--

Signed and Sealed this

Twenty-fourth Day of October, 1995

Attest:

BRUCE LEHMAN

Attesting Officer

Commissioner of Patents and Trademarks